Patented Aug. 28, 1928.

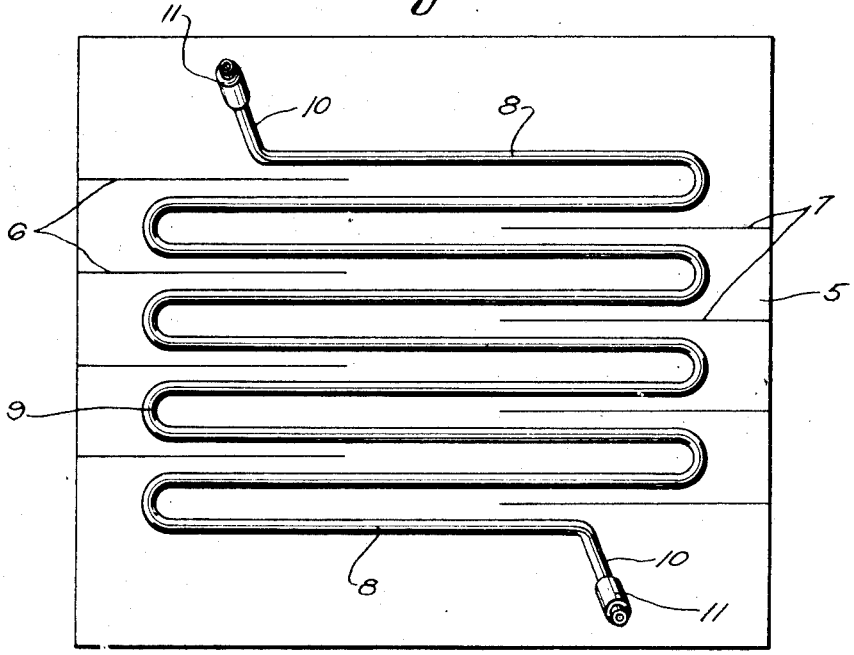
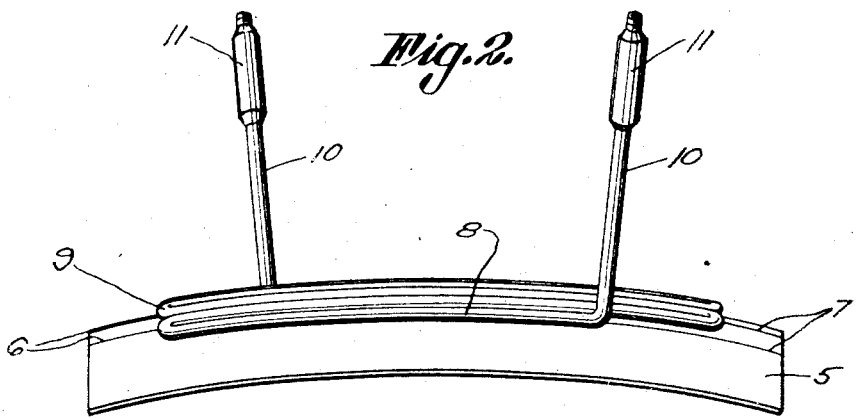

1,682,619

UNITED STATES PATENT OFFICE.

ERBEN E. LA TURNER, OF JEROME, IDAHO.

FLEXIBLE STEAM SPOTTER.

Application filed August 17, 1927. Serial No. 213,603.

The present invention relates to a device to be employed in connection with tire repairing machinery and aims to provide a novel form of heating device which may be applied to the outer surface of the tire casing to vulcanize rubber used in repairing a ruptured portion of the tire, in position.

An important object of the invention is to provide a device of this character including a supporting plate so constructed that it may bend laterally to conform to the shape of the tire casing on which the device is positioned.

A still further object of the invention is to so arrange the steam heating coils that the coils will not be affected by the bending of the body portion or supporting plate.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view illustrating a vulcanizing device constructed in accordance with the invention.

Figure 2 is a side elevational view thereof.

Referring to the drawing in detail, the reference character 5 designates the supporting plate of the device, which is preferably rectangular in formation, however the general contour of the device may be changed to meet various requirements.

The reference character 6 indicates slits extending from one edge of the plate, and terminating at a point near the center thereof, thereby providing a plurality of tongues or supporting surfaces which may be moved with respect to each other.

The reference character 7 indicates slots extending from the opposite edge of the plate, terminating at points near the center of the plate, the slots 7 having their inner ends disposed at points between lines forming continuations of the slots 6, to the end that the plate is exceptionally pliable so that it may be bent around a tire casing in such a way as to conform thereto.

Mounted on the plate, is a pipe 8 looped in such a way that a loop such as indicated at 9 will lie between the slits 6 and 7, the loops however being of lengths to terminate short of the side edges of the plate as clearly shown by Figure 1.

The ends of the pipe 8 extend upwardly as at 10, where they are provided with unions 11 which provide means for connecting a feed and exhaust pipe thereto.

In the use of the device, the plate is bent around a tire casing over a ruptured portion which has been filled in, with rubber to be vulcanized, whereupon steam is forced through the pipe 8 which circulates through the looped portions thereof, heating the plate and causing the rubber contacting with the plate to become vulcanized.

I claim:

1. A vulcanizing device including a plate having slits extending from the side edges thereof to permit the plate to be bent over a tire casing, a pipe formed into loops, secured to the plate, and said loops adapted to be supplied with steam to heat the plate to vulcanize rubber contacting with the plate.

2. A vulcanizing device including a plate, said plate having slits extending from the side edges thereof and terminating at points near the center thereof, said slits permitting the plate to be bent over the tire casing, and a pipe secured to the plate and adapted to be supplied with steam to heat the plate.

3. A vulcanizing device including a plate, said plate having slits extending from the side edges thereof and disposed in spaced relation with each other, the slits at one side of the plate lying between lines extended from the slits at the opposite side of the plate, and a steam pipe secured to the plate to heat the plate.

In testimony that I claim the foregoing as my own, I have hereto affixed my signature.

ERBEN E. LA TURNER.